May 27, 1958   M. L. SILEN   2,836,001
FISH LURE
Filed March 10, 1955
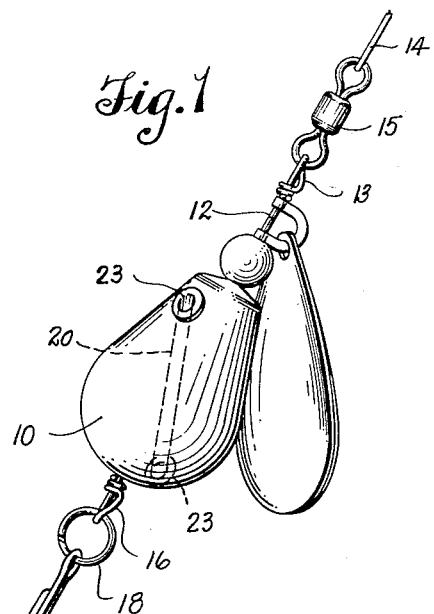
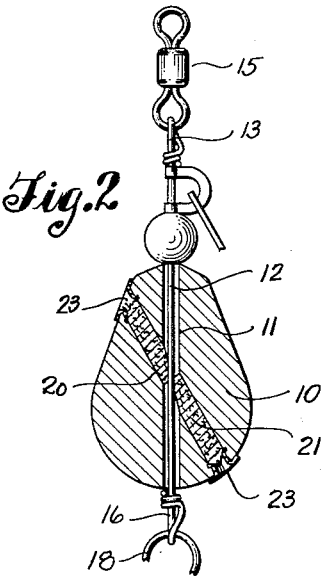
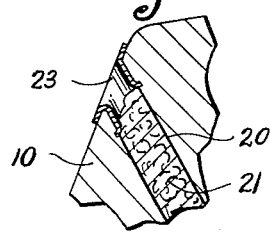
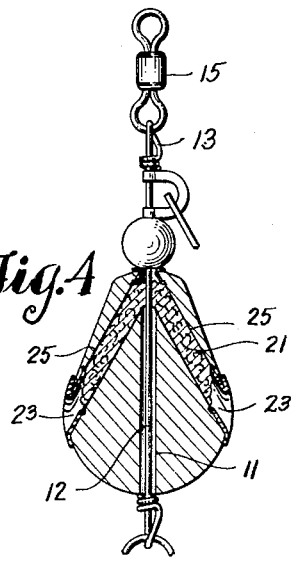
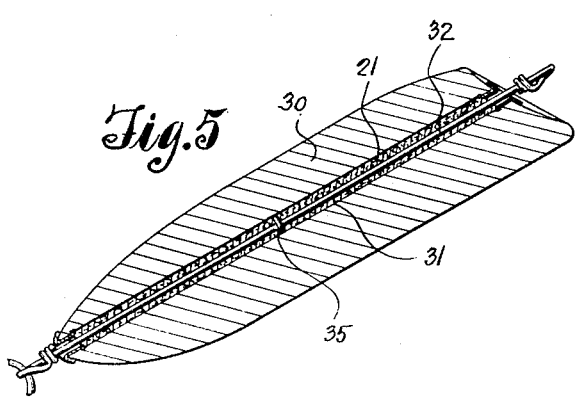
INVENTOR.
MELVIN L. SILEN
BY
Cook & Robinson
ATTORNEYS

United States Patent Office 2,836,001
Patented May 27, 1958

2,836,001

FISH LURE

Melvin L. Silen, Seattle, Wash.

Application March 10, 1955, Serial No. 493,408

1 Claim. (Cl. 43—42.06)

This invention relates to fish lures and it has reference more particularly to the provision of means in lures including bobbers, plugs, and the like, for the holding of a supply of substance which will be dissipated into the water during use of the lure, as a scent, essence or taste that is attractive to fish.

It is the principal object of the present invention to provide lures such as plugs, bobbers and other type of fish luring means with channels therethrough or therein and to place therein a suitable amount of absorbent material, such for example, yarn or cotton, and to saturate this with fish oil, anise oil, or any other solution or liquid that is attractive to fish upon being dissipated into the fishing waters.

It is a further object of the invention to locate the channel or channels in the plug or lure body, that the action of the lure in the water will facilitate the dissipation of the essence.

Further objects and advantages of the invention reside in the details of construction and combination of parts as comprised by the lure and in the mode of use of the lure to gain the best effect of the essence, as will hereinafter be fully described.

In accomplishing these above mentioned and other objects of the invention, I have provided the improved details of construction, the preferred forms of which are illustrated in the accompanying drawings, wherein:

Fig. 1 is a perspective view of a fish lure embodying the present invention therein.

Fig. 2 is a view in which the body of the lure is shown in longitudinal section disclosing the channel therethrough as filled with the absorbent carrier material for the scenting solution.

Fig. 3 is an enlarged sectional detail showing a grommet applied to the channel end as a means for retaining the absorbent material therein.

Fig. 4 is a sectional view of a lure showing an alternative arrangement of channels for the essence carrying material.

Fig. 5 is a longitudinal section of a plug as equipped to carry the present baiting material.

Referring more in detail to the drawings:

In Figs. 1 and 2, I have shown a present day type of fish lure comprising a body or bobber 10, of a typical form, having an axial bore 11 through which a wire 12 is extended; the wire being formed beyond one end of the bobber with a loop 13 to which a line, or leader 14, is attached through the mediacy of a swivel 15, and formed at its other end, beyond the corresponding end of the bobber, with a loop 16 to which fish hooks 17 are attached by means of a split ring 18.

Formed through the bobber 10 in an angular direction relative to the channel 11, and opening at its opposite ends through the forward and rearward end portions of the bobber, is a bore or channel 20; this being filled with an absorbent material such as yarn or cotton, designated at 21. To retain this material the channel is partially closed at its ends by metal or plastic grommets 23 that are press fitted therein.

To prepare the lure for use, the yarn or cotton is saturated with a substance such as fish oil, anise oil or other substance or solution or essence which has an attractive influence on fish. This may be accomplished in various ways. Fishing is carried on in the usual way. In drawing the lure through the water, the substance will be dissipated from the cotton or carrying material into the water. This dissipation of essence is facilitated by so placing the channel in the body 10 that water will be forced into the channel at its forward end and caused to ooze through the cotton and from the trailing end of the channel, carrying with it a certain amount of the scent or essence of the fish attracting substance or solution. When necessary, the cotton can be recharged with the attracting solution. A practical and convenient means for doing this is a small oil can from which the solution can be squirted into the ends of the channel.

The use of the grommets 23 in the ends of the channel may not be necessary, but is desirable as they somewhat reduce the diameter of the channel at its ends. Furthermore, the grommets serve not only to retain the absorbent material against displacement but also reduces the flow of water through the channel.

In Fig. 4, I have shown an alternative manner of applying the bait containing channels to the body. This view shows a plurality of channels 25 formed in the body 10a; leading from its trailing end portion and converging into the forward end portion of the axial channel 11. Each of these channels contains the absorbent material 21 and are closed at their ends by grommets 23 as in the device of Fig. 2.

In Fig. 5, the present invention is shown as applied to a typical form of plug 30; this being formed with a longitudinal bore 31 through which a wire 32 is passed to join the fishing line and hooks, not herein shown, in a manner similar to that illustrated in Fig. 2. The bore 31 contains absorbent material 21 and thus is retained against displacement by the application of grommets 23a to the ends of the bore. Fixed on the wire, within the bore, is a disk 35 which operates as a piston with longitudinal movement of the wire relative to the plug, to induce inflow of water into contact with the essence saturated material 21 and its expulsion from the channel and material.

Devices of the kind shown, so equipped with channels for containing an absorbent material, which may be saturated or impregnated with an oil, or other substance, that is attractive to fish, and which in use by the lure will be dissipated slowly into the water, are practical for use, easily charged, and very effective for the intended purpose.

It is not the intent that the invention be restricted to use only with lures of the kinds shown, but that it be applied to any lure body which provides for a similar use of materials.

In the following claim, the word "body" as used in describing a part of the lure is intended to cover any member of any shape or size that can be formed with the channel to hold the absorbent material. The term "absorbent" has reference to any material such as those mentioned, and also any other substance such as steel wool or wire that will operate to hold a quantity of the oil, essence or solution used to attract the fish.

Having thus described my invention, what I claim as new therein and desire to secure by Letters Patent is:

A fish lure comprising an elongated body equipped with means whereby it is adapted to be supported in and drawn through the water, said body being of fish plug configuration and being pointed at its rearward end, a channel formed therethrough and terminating at the point, an absorbent material in the channel impregnated with a substance that is attractive to fish and which will be dissipated from said material into the water, a wire movable endwise in the channel, a piston fixed on the wire medially of its ends, to act against said absorbent material, end means on the ends of the wire to limit the movement thereof, and the distance between the end means being greater than the length of the channel.

References Cited in the file of this patent

UNITED STATES PATENTS

| | | |
|---|---|---|
| 2,091,457 | Sauer | Aug. 31, 1937 |
| 2,225,676 | White | Dec. 24, 1940 |
| 2,532,879 | Baker | Dec. 5, 1950 |
| 2,556,634 | Redinger | June 12, 1951 |
| 2,703,945 | Johnson | Mar. 15, 1955 |